(12) United States Patent
Garg et al.

(10) Patent No.: US 12,300,243 B2
(45) Date of Patent: *May 13, 2025

(54) SYSTEM AND METHOD FOR MULTI-MODAL PODCAST SUMMARIZATION

(71) Applicant: Gracenote, Inc., Emeryville, CA (US)

(72) Inventors: Amanmeet Garg, Sunnyvale, CA (US); Aneesh Vartakavi, Emeryville, CA (US); Joshua Ernest Morris, Nashville, TN (US)

(73) Assignee: Gracenote, Inc., Emeryville, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 17/677,186

(22) Filed: Feb. 22, 2022

(65) Prior Publication Data

US 2022/0172726 A1    Jun. 2, 2022

Related U.S. Application Data

(63) Continuation of application No. 17/036,136, filed on Sep. 29, 2020, now Pat. No. 11,295,746.

(Continued)

(51) Int. Cl.
  *G10L 15/26* (2006.01)
  *G10L 15/02* (2006.01)

(52) U.S. Cl.
  CPC .............. *G10L 15/26* (2013.01); *G10L 15/02* (2013.01)

(58) Field of Classification Search
  CPC .......... G10L 15/26; G10L 15/02; G10L 25/81

(Continued)

(56) References Cited

U.S. PATENT DOCUMENTS 8,056,101 B2    11/2011   Gibbon et al.
8,438,485 B2     5/2013   Kulis et al.
(Continued)

FOREIGN PATENT DOCUMENTS

KR    10-2015-0118002 A    10/2015

OTHER PUBLICATIONS

International Searching Authority, International Search Report and Written Opinion dated Oct. 20, 2021, issued in connection with International Patent Application No. PCT/US2021/041010.

(Continued)

*Primary Examiner* — George C Monikang
(74) *Attorney, Agent, or Firm* — McDonnell Boehnen Hulbert & Berghoff LLP

(57) ABSTRACT

In one aspect, a method includes receiving podcast content, generating a transcript of at least a portion of the podcast content, and parsing the podcast content to (i) identify audio segments within the podcast content, (ii) determine classifications for the audio segments, (iii) identify audio segment offsets, and (iv) identify sentence offsets. The method also includes based on the audio segments, the classifications, the audio segment offsets, and the sentence offsets, dividing the generated transcript into text sentences and, from among the text sentences of the divided transcript, selecting a group of text sentences for use in generating an audio summary of the podcast content. The method also includes based on timestamps at which the group of text sentences begin in the podcast content, combining portions of audio in the podcast content that correspond to the group of text sentences to generate an audio file representing the audio summary.

20 Claims, 5 Drawing Sheets

Related U.S. Application Data

(60) Provisional application No. 63/052,009, filed on Jul. 15, 2020.

(58) Field of Classification Search
USPC .................................. 704/231, 239, 246, 251
See application file for complete search history.

(56) References Cited

U.S. PATENT DOCUMENTS

| | | |
|---|---|---|
| 8,527,520 B2 | 9/2013 | Morton et al. |
| 8,566,877 B2 | 10/2013 | Gibbon et al. |
| 8,645,991 B2 | 2/2014 | McIntire et al. |
| 9,092,542 B2 | 7/2015 | Bodin et al. |
| 9,569,167 B2 | 2/2017 | Watts |
| 9,940,947 B2 | 4/2018 | Watts |
| 10,354,676 B2 | 7/2019 | Watts |
| 2002/0120939 A1 | 8/2002 | Wall et al. |
| 2006/0065102 A1 | 3/2006 | Xu |
| 2007/0250901 A1 | 10/2007 | McIntire et al. |
| 2008/0107102 A1 | 5/2008 | Kaufman et al. |
| 2008/0109850 A1 | 5/2008 | Gibbon et al. |
| 2008/0300872 A1* | 12/2008 | Basu .................... G06F 16/7844 704/235 |
| 2009/0254352 A1* | 10/2009 | Zhao ...................... G10L 25/78 704/500 |
| 2010/0241963 A1 | 9/2010 | Kulis et al. |
| 2012/0030709 A1 | 2/2012 | Gibbon et al. |
| 2013/0231931 A1 | 9/2013 | Kulis et al. |
| 2014/0223475 A1 | 8/2014 | Mcintire et al. |
| 2014/0277652 A1 | 9/2014 | Watts |
| 2015/0149172 A1 | 5/2015 | Doyle et al. |
| 2017/0092291 A1 | 3/2017 | Watts |
| 2017/0169853 A1 | 6/2017 | Hu et al. |
| 2017/0213469 A1 | 7/2017 | Elchik et al. |
| 2018/0218748 A1 | 8/2018 | Watts |
| 2020/0250277 A1* | 8/2020 | Mallette .................. G06F 40/35 |
| 2020/0327817 A1 | 10/2020 | Raynaud |
| 2021/0043174 A1* | 2/2021 | Radin ................. G10H 1/0041 |
| 2021/0326098 A1 | 10/2021 | Neckermann et al. |

OTHER PUBLICATIONS

Vartakavi et al., "PodSumm: Podcast Audio Summarization", published Sep. 22, 2020, https://arxiv.org/abs/2009.10315.

* cited by examiner

SYSTEM AND METHOD FOR MULTI-MODAL PODCAST SUMMARIZATION

CROSS REFERENCE TO RELATED APPLICATIONS

This disclosure is a continuation of U.S. patent application Ser. No. 17/036,136, filed Sep. 29, 2020, which claims priority to U.S. Provisional Pat. App. No. 63/052,009, filed Jul. 15, 2020, which are hereby incorporated by reference herein in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method is disclosed. The method includes receiving podcast content. The method also includes generating a transcript of at least a portion of the podcast content. The method also includes parsing the podcast content to (i) identify audio segments within the podcast content, (ii) determine classifications for the audio segments, (iii) identify audio segment offsets, each audio segment offset corresponding to a respective time offset at which a respective audio segment begins relative to a start time of the podcast content, and (iv) identify sentence offsets, each sentence offset corresponding to a respective time offset at which a respective pause occurs relative to the start time of the podcast content. The method also includes based on the identified audio segments, the determined classifications, the identified audio segment offsets, and the identified sentence offsets, dividing the generated transcript into text sentences. The method also includes from among the text sentences of the divided transcript, selecting a group of text sentences for use in generating an audio summary of the podcast content. The method also includes based on timestamps at which the group of text sentences begin in the podcast content, combining portions of audio in the podcast content that correspond to the group of text sentences to generate an audio file representing the audio summary of the podcast content.

In another aspect, a non-transitory computer-readable storage medium is disclosed. The computer-readable storage medium has stored thereon program instructions that, upon execution by a processor, cause performance of a set of operations. The set of operations includes receiving podcast content. The set of operations also includes generating a transcript of at least a portion of the podcast content. The set of operations also includes parsing the podcast content to (i) identify audio segments within the podcast content, (ii) determine classifications for the audio segments, (iii) identify audio segment offsets, each audio segment offset corresponding to a respective time offset at which a respective audio segment begins relative to a start time of the podcast content, and (iv) identify sentence offsets, each sentence offset corresponding to a respective time offset at which a respective pause occurs relative to the start time of the podcast content. The set of operations also includes based on the identified audio segments, the determined classifications, the identified audio segment offsets, and the identified sentence offsets, dividing the generated transcript into text sentences. The set of operations also includes from among the text sentences of the divided transcript, selecting a group of text sentences for use in generating an audio summary of the podcast content. The set of operations also includes based on timestamps at which the group of text sentences begin in the podcast content, combining portions of audio in the podcast content that correspond to the group of text sentences to generate an audio file representing the audio summary of the podcast content.

In another aspect, a computing system includes a processor and a non-transitory computer-readable storage medium, having stored thereon program instructions that, upon execution by the processor, cause performance of a set of operations. The set of operations includes receiving podcast content. The set of operations also includes generating a transcript of at least a portion of the podcast content. The set of operations also includes parsing the podcast content to (i) identify audio segments within the podcast content, (ii) determine classifications for the audio segments, (iii) identify audio segment offsets, each audio segment offset corresponding to a respective time offset at which a respective audio segment begins relative to a start time of the podcast content, and (iv) identify sentence offsets, each sentence offset corresponding to a respective time offset at which a respective pause occurs relative to the start time of the podcast content. The set of operations also includes based on the identified audio segments, the determined classifications, the identified audio segment offsets, and the identified sentence offsets, dividing the generated transcript into text sentences. The set of operations also includes from among the text sentences of the divided transcript, selecting a group of text sentences for use in generating an audio summary of the podcast content. The set of operations also includes based on timestamps at which the group of text sentences begin in the podcast content, combining portions of audio in the podcast content that correspond to the group of text sentences to generate an audio file representing the audio summary of the podcast content.

DETAILED DESCRIPTION

I. Overview

Figure 1:
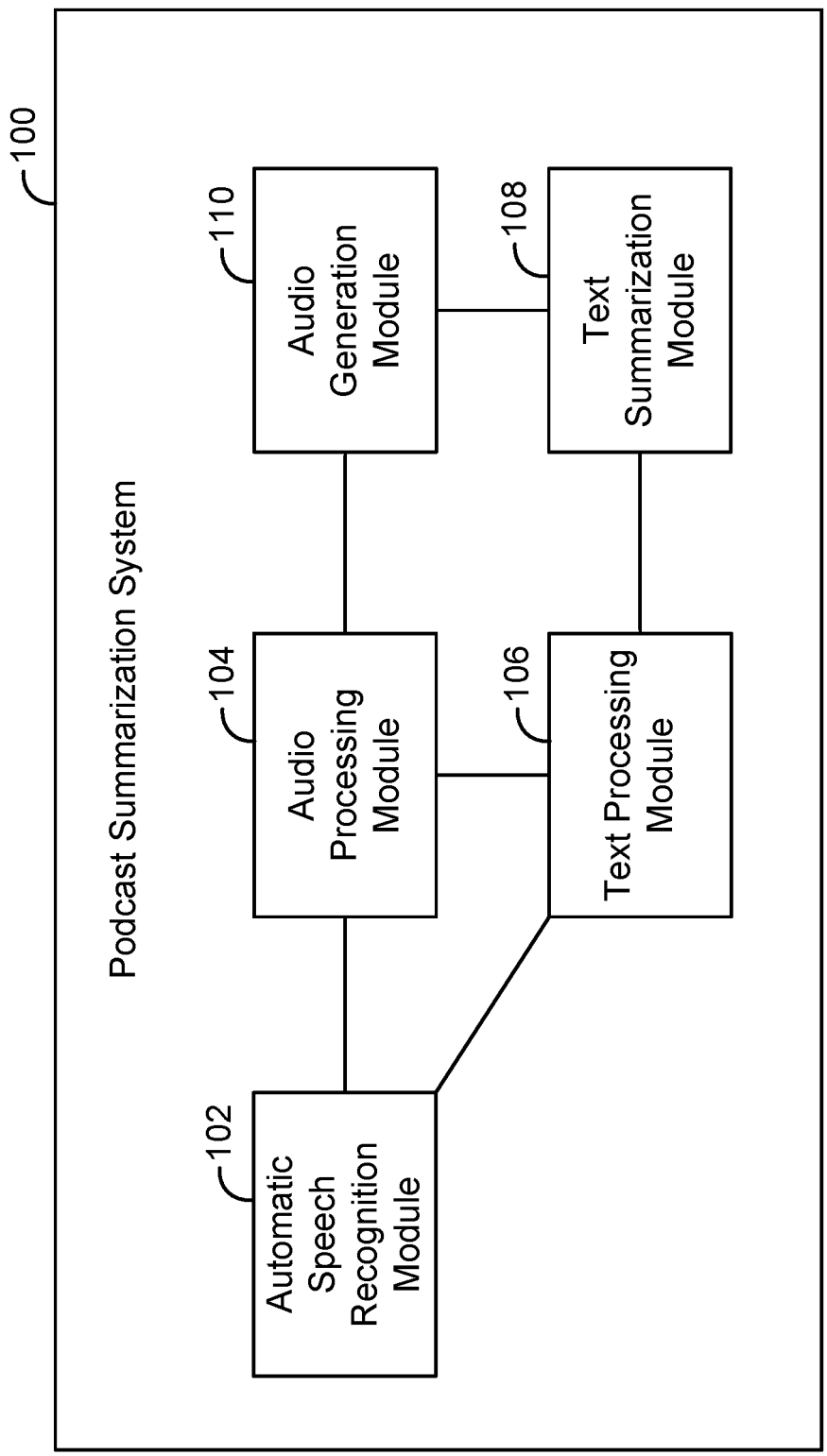
FIG. 1 is a simplified block diagram illustrating an example podcast summarization system in which various described principles can be implemented.

A content distribution system, such as a server, can be configured to maintain and provide access to podcast content (e.g., podcast files) over a web feed, such as RDF Site Summary (RSS). In turn, an end-user can use a web browser or another type of software application installed on a client device to download or stream the podcast content from the content distribution system. As an example, the podcast content can take the form of a digital audio file recording of a spoken word podcast "episode."

Various factors can influence end-user preference in podcast content, such as the speaking style of the hosts or other speakers in the podcast, the production quality of the podcast, the music in the podcast, and/or the subject matter discussed in the podcast. In practice, however, the content distribution system might not provide at least a portion of this information and, as a more general matter, might not provide enough information for end-users to gauge interest in the podcast content. For example, the content distribution system can identify a genre and/or content provider for a particular podcast file, but end-users might not find such information to be detailed or sufficient enough for them to gauge interest in the podcast episode. As another example, the content distribution system might provide a summary for the podcast content in an RSS feed, but the summary might not be useful to end-users when using smart speakers or car radios to navigate and discover podcast content.

Furthermore, for audio files consisting mostly or entirely of music, content distribution systems can at times use structural cues (e.g., when a chorus or repeated motif begins) to generate audio summaries that preview a song's chorus and/or other portions of the song. However, podcast content—especially podcast content that is primarily or entirely spoken word—are often less structured than songs, and thus, finding relevant portions of the podcast content to gauge end-user interest can be difficult. In addition, finding relevant portions of the podcast content can require existing content distribution systems to understand the meaning of the context of what is spoken in the podcast content, which such systems might not be well-equipped to do.

The present disclosure improves over existing content distribution systems by intelligently generating, and then delivering to a client device, an audio summary of podcast content. In particular, a podcast summarization system of a content distribution system can be trained to select sentences from the podcast content and combine the selected sentences to generate the audio summary. To facilitate this, for example, the podcast summarization system can parse the podcast content into sentences in both the audio and text domains, distinguish music segments from spoken segments, label sentences in both the audio and text domains (e.g., by speaker), then use the labels to select which sentences to include in the audio summary. By generating audio summaries in this way, end-users can more quickly determine whether they are interested in the podcast content, thus improving user experience.

In alternative embodiments, the client device (e.g., smartphone, laptop computer, etc.) of the end-user can include the podcast summarization system, in addition to or alternatively to a server of the content distribution system including the podcast summarization system. In such embodiments, upon receipt of at least a portion of the podcast content via download or stream, the client device can generate the audio summary.

The term "summary," as used in the context of podcast content in the present disclosure, refers to a summarization of what happens in the entirety of the podcast content, possibly revealing important information such as "spoilers" (e.g., surprise speakers or unexpected plot developments). In some embodiments, the present disclosure can also be used to generate an audio "preview" of the podcast content, which refers to a teaser of a portion of the content of the podcast content and typically does not reveal important information or other information that might be deemed as a "spoiler." To generate an audio preview, the podcast summarization system described herein can, in some embodiments, perform substantially the same or similar operations as described below for generating an audio summary. In other embodiments, at least one operation described below can be performed differently, such by implementing different machine learning logic configured to avoid selecting sentences that contain spoilers and/or configured to only select sentences within a window of time from the start time of the podcast content (e.g., only select sentences having a timestamp within the first three minutes of the podcast episode).

II. Architecture

A. Podcast Summarization System

FIG. 1 is a simplified block diagram illustrating an example podcast summarization system 100 in which various described principles can be implemented.

The podcast summarization system 100 can include various modules, such as automatic speech recognition (ASR) module 102, audio processing module 104, text processing module 106, text summarization module 108, and audio generation module 110. Each such module can take the form of computer program logic that is executable by a computing system, an example of which is described in FIG. 2. In this context, computer program logic can be or include machine learning logic and/or one or more algorithms that facilitate the performance of the operations described herein. In alternative embodiments, each such module can be, or be included as part of, a computing system, and the podcast summarization system 100 can be made up of a plurality of such computing systems.

The podcast summarization system 100 can also include one or more connection mechanisms that connect various modules within the podcast summarization system 100. For example, the podcast summarization system 100 can include the connection mechanisms represented by lines connecting components of the podcast summarization system 100, as shown in FIG. 1.

In this disclosure, the term "connection mechanism" means a mechanism that connects and facilitates communication between two or more modules, components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The ASR module 102 can be configured to receive podcast content, such as in the form of a digital audio file representing a podcast episode and transcribe speech in the podcast content into text. Further, the ASR module 102 can assign, to each of at least a subset of the spoken words in the podcast content, a respective text word, a respective start timestamp of when the spoken word begins relative to a start time (e.g., 00:00:00 seconds) of the podcast content (e.g., 30 seconds into the podcast), a respective end timestamp of when the spoken word ends relative to the start time (e.g., 31 seconds into the podcast), a respective duration of the spoken word, and a respective confidence score representing the likelihood that the assigned text word is the same as the spoken word. Herein, the term "word offset" refers collectively to the start and end timestamps, since the word offset can be or include one or both of such timestamps.

The audio processing module 104 can contain an audio classifier configured to detect, and distinguish between, speech and music present in the podcast content. For example, a podcast might begin with a first music segment (e.g., introduction music), followed by a first speech segment (e.g., an introduction speech), followed by a second music segment (e.g., a music interlude), and then followed by a second speech segment (e.g., the remainder of the podcast). To facilitate this, the audio processing module 104 can assign, to each of at least a subset of the segments, a label such as "music" or "speech." The audio processing module 104 can also be configured to identify who is speaking during the podcast (e.g., Speaker 1, Speaker 2) and assign a label to at least one of the speech segments that identifies the speaker for that segment. Additionally, the audio processing module 104 can be configured to detect pauses in the audio and transcript of the podcast content, determine a respective timestamp of when each pause begins and/or ends relative to the start time of the podcast content (referred to herein as a "sentence offset"), and determine a respective timestamp of when each segment (e.g., music segment, speech segment) begins and/or ends relative to the start time of the podcast content (referred to herein as a "segment offset"). Herein, the term "segment offset" refers collectively to the start and end timestamps for a segment, since the segment offset can be or include one or both of such timestamp s.

The text processing module 106 can be configured to divide the transcript generated by the ASR module 102 into text sentences based at least in part on detected pauses, detected music interludes, and the offsets. The text processing module 106 can also be configured to label each of at least a subset of the text sentences with a respective identifier of the speaker of that text sentence.

The text summarization module 108 can be configured to select sentences that are desirable candidates for generating a summary of the podcast.

The audio generation module 110 can be configured to use at least the selected candidate sentences, sentence offsets, segment offsets, and associated labels as a basis for generating an output audio file representing a summary of the podcast (referred to herein as a "podcast summary").

As noted above, the podcast summarization system 100 can be, or can be included as part of, a computing system such as a content distribution system (e.g., a server that maintains podcast content) or a client device (e.g., an end-user's smartphone or laptop computer).

B. Computing System

Figure 2:
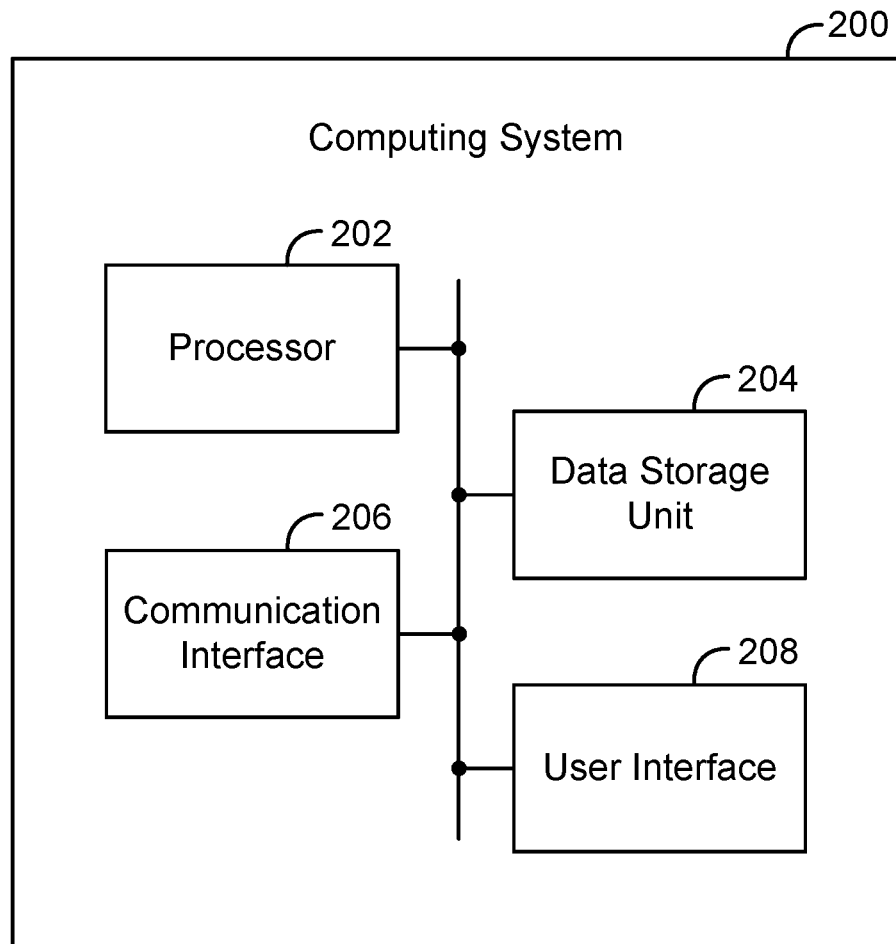
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the podcast summarization system 100 and/or modules thereof can take the form of a computing system, such as the computing system 200. In some cases, some or all these entities can take the form of a more specific type of computing system.

III. Example Operations

The podcast summarization system 100 and/or modules thereof can be configured to perform and/or can perform one or more operations. Examples of these operations and related features will now be described with respect to FIGS. 3A-3B.

In practice, it is likely that at least some of described operations will be performed many times (perhaps on a routine basis).

Figure 3A:
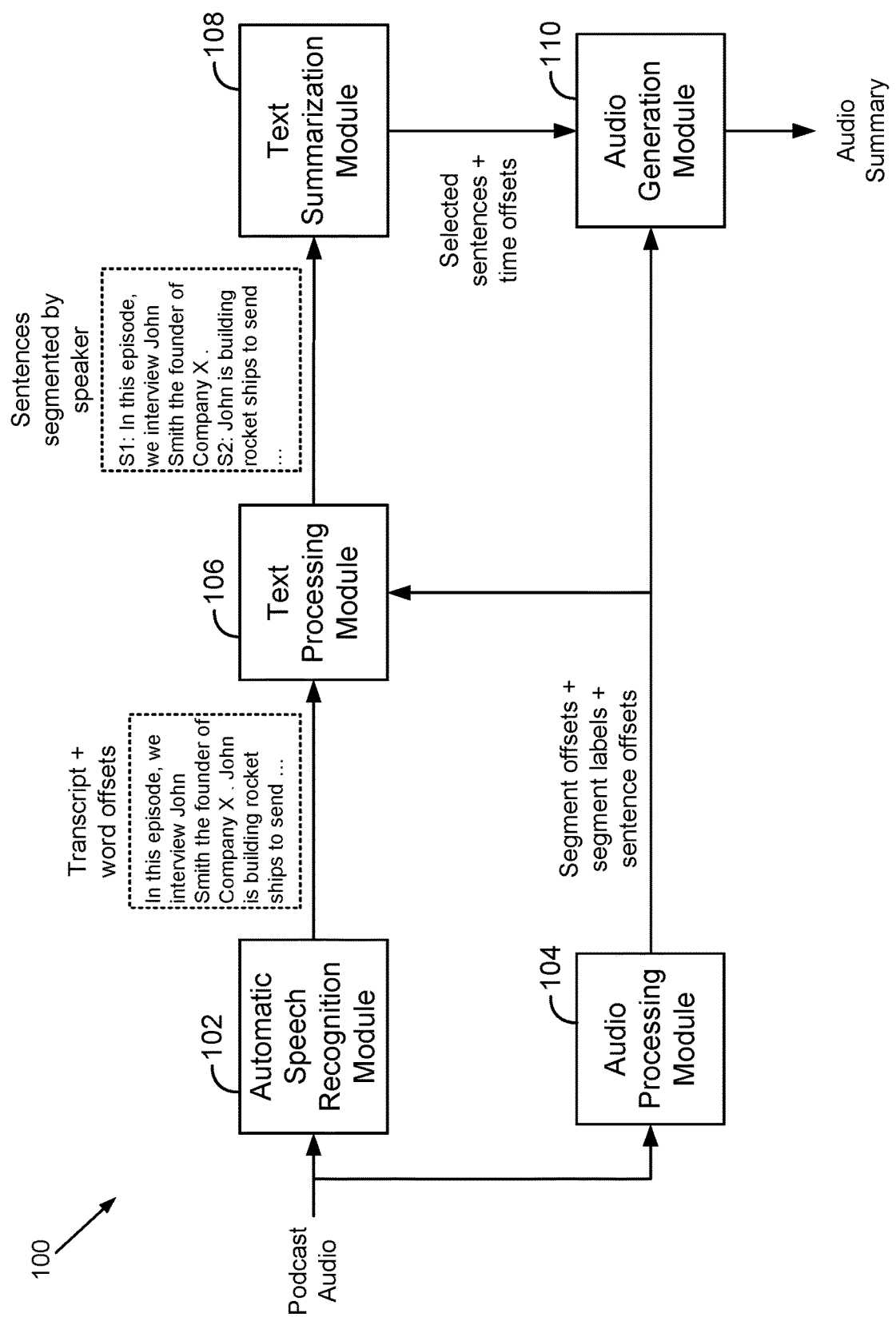
FIGS. 3A-3B illustrate example operations performed by the podcast summarization system of FIG. 1.

FIG. 3A illustrates example operations performed by the podcast summarization system 100.

As shown in FIG. 3A, the ASR module 102 and the audio processing module 104 can both receive podcast content comprising the audio of a podcast episode.

Upon receiving the podcast content, the ASR module 102 can transcribe at least a portion of the podcast content (e.g., at least a spoken word portion of the podcast content), and can generate a text file including the transcription. For example, the text file can begin with "In this episode, we interview John Smith, the founder of Company X. John is building rocket ships to send astronauts to the Moon. We asked John what he expects from the future of space travel, and whether he thinks we'll be colonizing the Moon within the next one hundred years."

As noted above, for each of at least a subset of the spoken words detected in the podcast content, the ASR module 102 can determine for, and assign to, the spoken word, a respective text word (e.g., the words that make up the above-noted example text file), a respective word offset, a respective duration of the spoken word, and a respective confidence score. For example, using the example text file noted above, (i) the text word "In" might be assigned a word offset of 20 seconds (e.g., after a 20-second music introduction), a duration of 0.4 seconds, and a confidence score of 85 out of 100, (ii) the text word "this" might be assigned a word offset of 20.5 seconds, a duration of 0.6 seconds and a confidence score of 80 out of 100, and (iii) the text word "episode" might be assigned a word offset of 21.2 seconds, a duration of 1 second, and a confidence score of 99 out of 100. If the ASR module 102 assigns a confidence score that is below a predefined threshold (e.g., 70 out of 100), the ASR module 102 might flag a timestamp of the spoken word to indicate to other modules of the podcast summarization system 100 that the confidence is lower than other spoken words in the podcast content.

In other examples, such as those where the ASR module 102 is not included as part of the podcast summarization system 100, the podcast summarization system 100 can obtain the text file and assigned text words, word offsets, durations, and/or confidence scores in other ways, such as by receiving them from a server or other computing device (e.g., the content distribution system that maintains podcast content).

Figure 3B:
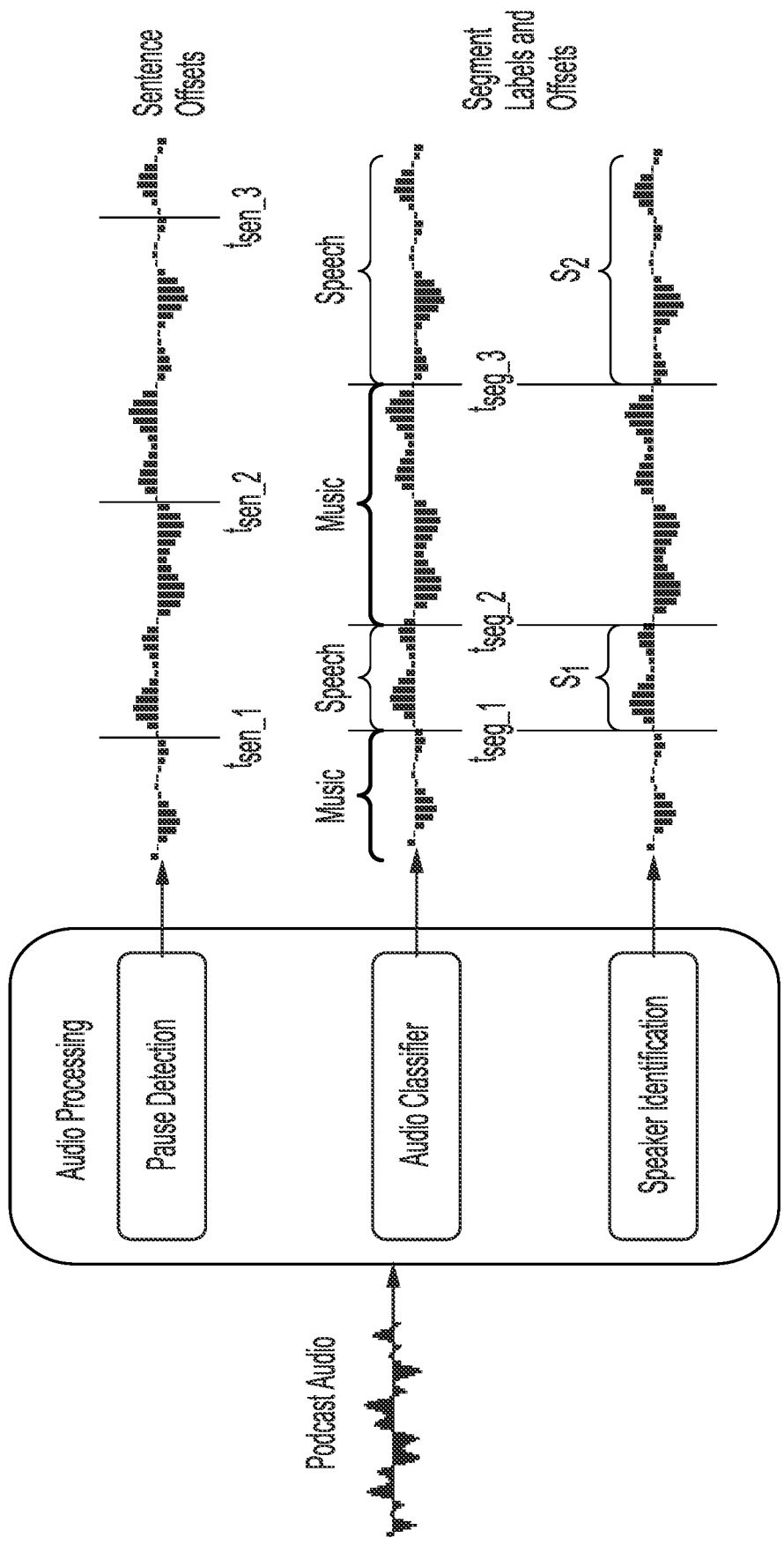

Upon receiving the podcast content, and before, after, or at substantially the same time as the ASR module 102 performs the aforementioned operations, the audio processing module 104 can perform various operations, examples of which are shown in FIG. 3B.

In particular, the audio processing module 104 parses the podcast content to identify audio segments (hereinafter, "segments," for brevity) of music, speech, and/or other potential classes of segments in the podcast content. Upon identifying a particular segment, an audio classifier of the audio processing module 104 can store in memory a label for that segment, such as "music" or "speech."

In some scenarios, segments might include both speech and music, such as when a host of the podcast is talking over an introductory music theme, or when a song is playing and has lyrics that are sung or spoken. In some embodiments, the audio processing module 104 can label such segments with a specialized label (e.g., "music and speech" or "song"). In other embodiments, the audio processing module 104 can label such segments by default as music, rather than speech. Alternatively, the audio processing module 104 can label such segments as speech.

The audio processing module 104 can also label segments in a way that distinguishes between different types of speech segments, such as a label for a spoken word advertisement and a separate label for speech segments that do not include an advertisement. To facilitate identification and labeling of segments in the manner described above, the audio processing module 104 can, for example, identify repeated audio segments within multiple similar podcast content (e.g., multiple similar podcast files), such as a spoken word advertisement that is present in multiple episodes of a podcast or a theme song present in multiple episodes of the podcast. The audio processing module 104 can use these identified audio segments to identify when, in the podcast content, such repeated audio segments occur.

As further shown in FIG. 3A, the audio processing module 104 identifies the speaker for speech segments and determines sentence offsets and segment offsets. The audio processing module 104 also identifies portions of the podcast episode when there is a transition in the flow of audio and/or in the flow of information in the audio and to distinguish between the different types of transitions. For example, the audio processing module 104 can be configured to label certain transitions as a "break" or a "pause," such as when a speaker stops speaking for more than two seconds and then the same speaker resumes speaking (e.g., between words in the middle of a spoken sentence, or between two sentences), or when a song briefly pauses between a verse and a chorus. For brevity, the term "pause" will be used herein to collectively refer to these and other types of transitions in the audio of the podcast content. It should be understood, however, that in some examples, a "break" can be defined as a different type of transition than a "pause," and the audio processing module 104 can be configured to distinguish between these and other types of transitions.

In some situations, breaks or pauses in sentences can occur where a comma, period, semicolon, colon, question mark, or exclamation point might typically be placed when writing such sentences. As another example, the audio processing module 104 can be configured to provide a different label for pauses between two different speakers and/or between speech and music. Pauses such as these can enable the podcast summarization system 100 to divide the audio and text of the podcast content and stitch the divided portions together to form the audio summary.

In some examples, the audio processing module 104 can be configured to determine that a pause has occurred when the audio processing module 104 detects at least a threshold time gap (e.g., three seconds) exists between continuous speech. In other examples, the audio processing module 104 can use machine learning that can, over time and across training data sets of various podcast content, determine and update the threshold time gap and thus enable the podcast summarization system 100 to more efficiently recognize when a pause has occurred. In still other examples, the audio processing module 104 can be configured to map certain pause detection thresholds with certain speakers as the podcast summarization system 100 learns different speaking styles. For example, different speakers (even within the same episode) may have a different style and rate of speaking, and some may pause longer than others. Thus, the audio processing module 104, upon recognizing that a certain speaker is speaking, can select a threshold for that speaker and determine that, during a segment in which that speaker is speaking, a pause has occurred when that threshold time has elapsed with no speaking or music.

As shown in FIG. 3B, for example, the podcast content begins with a first music segment, followed by (and shown in FIG. 3B from left to right) a first speech segment, followed by a second music segment, followed by a second speech segment, each of which can be labeled as such by the audio classifier. Additionally, a first pause is detected at a sentence offset of $t_{sen\_1}$, a second pause is detected at a sentence offset of $t_{sen\_2}$ (e.g., a pause during the second music segment), and a third pause is detected at a sentence offset of $t_{sen\_3}$ (e.g., a pause between sentences spoken during the second speech segment). Further, the first music segment begins at the zero-second mark, the first speech segment begins at a segment offset of $t_{seg\_1}$ (which might be the same timestamp as, or a similar timestamp to, $t_{sen\_1}$), the second music segment begins at a segment offset of $t_{seg\_2}$, and the second speech segment begins at a segment offset of $t_{seg\_3}$. Still further, a first speaker, $S_1$, is assigned as a label to the first speech segment, and a second speaker, $S_2$, is assigned as a label to the second speech segment.

As shown in FIG. 3A, the text processing module 106 receives the text file and word offsets from the ASR module 102, and also receives the segment offsets, segment labels (e.g., music, speech, speaker), and sentence offsets from the audio processing module 104. The text processing module 106 can receive other information from these modules as well, such as the word durations. The text processing module 106 then uses the received information to divide the transcript in the text file into text sentences and label each text sentence in at least a portion of the text sentences with a respective speaker. The text processing module 106 can also use at least the word offsets and word durations to determine and/or verify timestamps of when text sentences in the transcript begin and end, and to distinguish the end of a sentence from a pause in the middle of a sentence.

As an example, the received segment offsets and labels can include or indicate timestamps of when each music and speech segment begins and ends, as well as the identity of the speaker for each speech segment. This can enable the text processing module 106 to ignore music segments or other non-speech segments when determining how to divide up the transcript. Additionally, the text processing module 106 can use the speaker labels to insert a break in the text of the transcript that corresponds to when the speaker changes. In other words, using the speaker labels, the text processing module 106 can determine that, when the speaker changes (e.g., at a timestamp at which the audio processing module 104 determined a different speaker to now be speaking), one sentence ends and another sentence begins. The ability for the text processing module 106 to use the speaker labels can also be advantageous in that it allows the text processing module 106 to ignore, remove, or otherwise disregard speech segments and corresponding portions of the transcript where multiple speakers are talking at the same time, since it might be hard for an end-user to hear what is being said during such segments. Such segments might also be less semantically useful or otherwise less desirable for inclusion in the audio summary for the podcast content.

Furthermore, as noted above, the received sentence offsets can include or indicate respective start and/or end timestamps of when pauses occur, and the received word offsets can include or indicate respective start and/or end timestamps of when each word of at least a subset of the words in the transcript is spoken. The text processing module 106 can thus correlate the timestamps from at least the word offsets, segment offsets, and sentence offsets to divide the transcript into text sentences, determine timestamps of when the text sentences start and end in the podcast content, and label each text sentence with a speaker. As shown in FIG. 3A, for instance, a label for Speaker 1 is assigned to the sentence "In this episode, we interview John Smith, the founder of Company X," and a label for Speaker 2 is assigned to the sentence "John is building rocket ships to send astronauts to the Moon."

As a more particular example of what can occur during the text processing process, based on the word offset for "episode" being 21.2 seconds, the first speech segment being between the 20-second mark and the 28-second mark of the podcast content, and Speaker 1 being assigned to the first speech segment, the text processing module 106 can determine that Speaker 1 speaks the word "episode" and that "episode" is part of a first sentence that is spoken before sentence offset $t_{sen\_1}$. Further, based on the word offset for "rocket" having a timestamp that falls within the duration of the second speech segment, and also based on Speaker 2 being assigned to the second speech segment, the text processing module 106 can determine that Speaker 2 speaks the word "rocket" and that "rocket" is part of a second sentence. A similar process can be performed for each of one or more other words in the transcript as well.

Additionally, in some examples, machine learning elements of the text processing module 106 can be trained to intelligently use the sentence offsets to add punctuation (e.g., commas, periods) between words and/or change punctuation that was included in the transcript by the ASR module 102 if such punctuation was incorrect. This can be particularly advantageous because it provides the text summarization module 108 with text sentences that more accurately reflect the grammar and punctuation in what was spoken in the podcast content, thereby improving the quality of the set of text sentences from which the text summarization module 108 selects sentences for inclusion in the audio summary. In alternative examples, the ASR module 102 can be configured such that the outputted transcript from the ASR module 102 does not include any punctuation.

In other examples, the text processing module 106 can be configured to refine the sentence offsets based on any detected discrepancy between timestamps. For example, if a sentence offset indicates that a sentence ends at the 1-minute mark after the word "Moon" is spoken, but the word offset and/or word duration for "Moon" indicates high confidence that the word "Moon" was spoken until the 1.1-minute mark, the sentence offset might be adjusted to a timestamp of 1.1 minutes.

Other techniques for dividing the transcript into sentences and labeling such sentences are possible as well and could be implemented by the text processing module.

Having divided the transcript, the text processing module 106 can send, to the text summarization module 108, a file representing the divided transcript. The text summarization module 108 can then select, from the transcript, text sentences that are desirable candidates for generating a cohesive, desirable summary of the podcast. To facilitate this, the text summarization module 108 can be or include a machine learning model that intelligently selects a group of text sentences from the transcript. For example, if multiple speakers are present in the podcast content, the text summarization module 108 might select at least one text sentence from each speaker, in order to give the end-user an audio sample of each speaker. In addition, the text summarization module 108 can also receive, from the text processing module 106 or other modules, the segment offsets, segment labels, sentence offsets, word offsets, and/or word durations. The text summarization module 108 can use at least the received word offsets to determine a respective time offset for each selected text sentence—that is, a timestamp relative to the start time of the podcast content at which the selected text sentence begins and/or ends. For instance, the text summarization module 108 can use at least the received word offsets as the timestamps for when each of the selected text sentences begins.

In some examples, the text summarization module 108 can be configured to select sentences whose collective durations (dictated by their respective timestamps) do not exceed a particular threshold duration. For example, the text summarization module 108 can be configured to generate an audio summary that does not exceed 60 seconds, and would select sentences whose durations add up to 60 seconds or less.

In other examples, the text summarization module 108 can be configured to select sentences that have a contextual similarity to other selected sentences. To facilitate this, for example, human operators might read numerous (e.g., hundreds or thousands) of divided transcripts, listen to numerous corresponding podcast content, and manually select, for each podcast content, respective sentences from that podcast content's transcript that are closely and contextually relevant to each other and that the human operator believes will make up a desirable audio summary. This training data can be used by the text summarization module 108 to more intelligently select contextually-similar sentences.

Selecting contextually-similar sentences can, in some examples, involve the text summarization module 108 selecting sentences that occur close to each other in the podcast content. For instance, if the text summarization module 108 determines the tenth and twelfth sentences in the divided transcript to be contextually-similar and strong candidates for the audio summary, the text summarization module 108 can also select the eleventh sentence as well. Selecting sentences in this way can advantageously reduce the number of cuts between sentences that do not naturally occur sequentially in the podcast content, thereby improving user experience.

In other examples, the text summarization module 108 can detect "named entities," such as people, places, corporations, music artists, dates, or other proper nouns in the transcript and select sentences that have over a threshold quantity of named entities (e.g., more than two), since it might be desirable in some situations to include sentences with more factual information regarding named entities in the audio summary. To facilitate this, the podcast summarization system 100 can store in memory (e.g., a database), or otherwise have access to, a stored list of named entities. The list can be periodically updated by the content provider or dynamically and automatically by the podcast summarization system 100 itself. For instance, if the podcast summarization system 100 recognizes a particular word that is in the transcript and/or spoken in the audio of the podcast file appearing at a high frequency across a single podcast file or across multiple podcast files (e.g., the name of a sponsor of the podcast with which the podcast content is associated), the podcast summarization system 100 can add the particular word to the list as a named entity. Other examples are possible as well. In some embodiments, the podcast summarization system 100 can include—either as part of the text summarization module 108 or as a separate module—a machine learning model that can parse the transcript before, during, or after the transcript is divided to identify such named entities.

In still other examples, the text summarization module 108 can be configured to select sentences based on such sentences being within a particular pre-determined time range, such as within a minute before a theme song (e.g., music segment) of the podcast content plays and/or a minute after the theme song of the podcast content pays. The particular time range can be adjusted and can alternatively be relative to other segments, such as within thirty seconds of a spoken word advertisement. In some scenarios, it may be desirable to select sentences near the end of the podcast content, such as 30 seconds before the end credits of the podcast episode, and the text summarization module 108 can be configured accordingly.

In still other examples, the text summarization module 108 can select sentences that have at least a threshold degree of similarity with sentences from a pre-determined text or audio provider-created summary provided and recommended by the content provider of the podcast content (e.g., an entity that runs a podcast network and manages the server that maintains the podcast content), also referred to herein as a "provider-created summary," which might be delivered to the podcast summarization system 100 in an RSS feed. To facilitate this, the podcast summarization system 100 can store in memory (e.g., a database), or otherwise have access to, a stored list of keywords, such as proper nouns, dates, or other keywords that appear in one or more provider-created summaries. For example, if the provider-created summary says "John Smith, the founder of Company X," the text summarization module 108 might search for keywords in the provider-created summary such as "John Smith," "founder," and "Company X" and search for sentences in the transcript that include those keywords. The text summarization module 108 might then rank or label sentences in the transcript based on which contain the most keywords from the provider-created summary, and/or which contain more than a threshold quantity of keywords from the provider-created summary.

In still other examples, the podcast content can include associated metadata that identifies, among other things, a content provider associated with the podcast content, a title of the podcast (e.g., the name shared by a series of podcast episodes) with which the podcast content is associated, and a title of the podcast episode. The text summarization module 108 can use such information to decide which sentences to select. For example, the text summarization module 108 might recognize (and store in memory) that, for a majority of podcast episodes of a particular podcast title, the guest speaker is announced at approximately the 5-second mark, and might thus select a sentence that begins at approximately the 5-second mark for each podcast content that is associated with that podcast title. Other examples are possible as well.

Having selected the sentences from the transcript and determined the time offsets for those sentences, the text summarization module 108 can send the selected sentences and the determined time offsets for the selected sentences to the audio generation module 110. The audio generation module 110 can then use the time offsets to map the selected sentences to the corresponding audio portions of the podcast content (i.e., the corresponding spoken versions of the selected text sentences) and combine those audio portions to generate an output audio file representing a summary of the podcast content. The sentences can be combined chronologically in order of earliest to latest timestamp in the podcast content, or can be reordered by the audio generation module 110 before combining.

During the training phase for the machine learning elements in the podcast summarization system 100, the podcast content, the output audio file, and/or the divided transcript can be annotated by a human operator with various information, and such annotations can be used thereafter by modules of the podcast summarization system 100 to improve the manner in which the audio summaries are generated. For example, the text summarization module 108 can use the annotations to improve how the text summarization module 108 selects sentences for inclusion in the audio summary. Annotations can include, by way of example, (i) identifiers of audio segments or text sentences that the human operator deems most-suitable for inclusion in the audio summary. For instance, the text sentences can be numbered in order and the human operator can select a subset of those numbers (e.g., a selection of sentences 1, 3, 4, and 5, as suitable for generating an audio summary). Similarly, the human operator might select text sentences or audio segments that the human operator believes should not be included in the audio summary and thus the text summarization module 108 might ignore similar sentences/segments in later podcast content. Annotations can also include indications of user emotion, such as positive or negative reactions to certain text sentences or audio segments. Other examples are possible as well.

In some examples, during the training phase for the machine learning elements in the podcast summarization system 100, human operators may manually assign "class" labels to podcast content, which can be stored as metadata included with the respective podcast files. A class label for a particular podcast file can indicate a type of summary that the human operator deems most-suitable for the podcast file. For example, the class label can be an algorithm-based audio summary, such as the audio summary generated by the podcast summarization system 100 as described above. As another example, the human operator might determine that, for one reason or another, the podcast content might not easily be able to be summarized, in which case the class label can indicate that the summary for the podcast content should be either (i) a provider-created summary delivered in the RSS feed or (ii) a scripted summary. A scripted summary can be a summary that is manually created, or autonomously created, by an entity that developed the podcast summarization system 100 and that might control operation of the podcast summarization system 100. The scripted summary can be created based on known information associated with the podcast content, such as the metadata noted above, that identifies the type of the podcast content, title of the podcast, podcast episode number, the host(s) of the podcast, the guest(s) in the podcast, and the topic(s) discussed in the podcast, for example. As a more particular example, the scripted summary can follow a particular template, such as "In this episode [number] of [series name], [host] talks to [guest], about [topic 1], [topic 2], and [topic 3]," with the known information inserted in the locations marked with brackets. Other example templates are possible as well.

In further examples, the act of selecting the text sentences that are desirable candidates for generating the audio summary can involve the text summarization module 108 annotating each text sentence in the divided transcript with an indicator (e.g., score) of whether the text sentence should be included in or excluded from the audio summary.

Using the class label for podcast content, the podcast summarization system 100 can receive the podcast content and its metadata and refer to the class label in the metadata to determine whether to generate the audio summary for the podcast content using the process described above or rather to use provider summary or scripted summary.

In some examples, the podcast summarization system 100 can use the segment offsets, segment labels, sentence offsets, word offsets, and/or word durations from various podcast content as a basis for training machine learning elements of the podcast summarization system 100 to predict word offsets and/or word durations (and thus the timestamps associated therewith), in which case the ASR module 102 can be an optional component.

Figure 4:
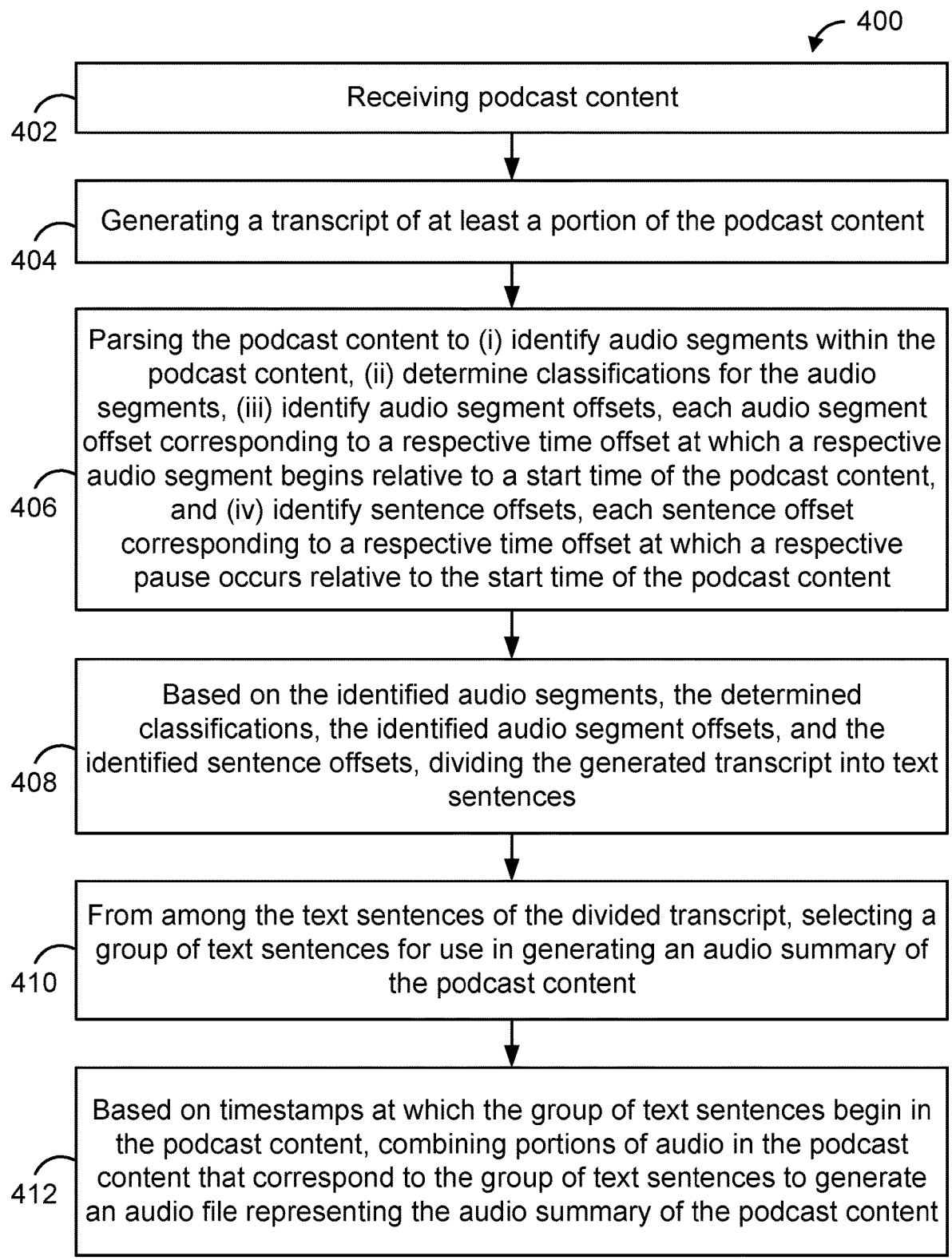
FIG. 4 is a flow chart of an example method.

FIG. 4 is a flow chart of an example method 400. At block 402, the method 400 includes receiving podcast content.

At block 404, the method 400 includes generating a transcript of at least a portion of the podcast content.

At block 406, the method 400 includes parsing the podcast content to (i) identify audio segments within the podcast content, (ii) determine classifications for the audio segments, (iii) identify audio segment offsets, each audio segment offset corresponding to a respective time offset at which a respective audio segment begins relative to a start time of the podcast content, and (iv) identify sentence offsets, each sentence offset corresponding to a respective time offset at which a respective pause occurs relative to the start time of the podcast content.

At block 408, the method 400 includes based on the identified audio segments, the determined classifications, the identified audio segment offsets, and the identified sentence offsets, dividing the generated transcript into text sentences.

At block 410, the method 400 includes from among the text sentences of the divided transcript, selecting a group of text sentences for use in generating an audio summary of the podcast content.

At block 412, the method 400 includes based on timestamps at which the group of text sentences begin in the podcast content, combining portions of audio in the podcast content that correspond to the group of text sentences to generate an audio file representing the audio summary of the podcast content.

The method 400 and related acts can be performed at least in part by any one or more components of the podcast summarization system 100. In particular, in some embodiments, the method 400 can be performed by a server computing system of a content distribution system that maintains and provides access to the podcast content. Additionally or alternatively, in some embodiments, the method 400 can be performed by a client device.

In some embodiments, the method 400 can also include parsing the podcast content to identify speakers of the audio segments and labeling each text sentence of the divided transcript with a respective one of the identified speakers. In such embodiments, the act of selecting the group of text sentences for use in generating the audio summary of the podcast content can be performed based at least in part on the speakers with which at least a portion of the group of text sentences are labeled.

In some embodiments, the identified classifications distinguish speech audio segments from music audio segments.

In some embodiments, the act of selecting the group of text sentences can involve selecting the group of text sentences based at least in part on the group of text sentences each being within a pre-determined time range within the podcast content.

In some embodiments, the method 400 can also include receiving a pre-determined text or audio provider-created summary associated with a content provider of the podcast content. In such embodiments, the act of selecting the group of text sentences can involve selecting the group of text sentences based at least in part on the group of text sentences each having at least a threshold quantity of keywords from a stored list of keywords, the stored list of keywords including proper nouns and dates.

In some embodiments, the method 400 can involve receiving a pre-determined text or audio provider-created summary associated with a content provider of the podcast content. In such embodiments, the act of selecting the group of text sentences can involve selecting the group of text sentences based at least in part on the group of text sentences each having at least a threshold degree of similarity with sentences from the pre-determined text or audio provider-created summary, where the group of text sentences each having at least a threshold degree of similarity with sentences from the pre-determined text or audio provider-created summary is based at least in part on the group of text sentences each having at least a threshold quantity of keywords that are included as text or spoken in the pre-determined text or audio provider-created summary.

In some embodiments, the podcast content represents an episode of a podcast, and the method 400 can involve receiving metadata associated with the podcast content, the metadata identifying a content provider associated with the podcast content, a title of the podcast, and a title of the episode. In such embodiments, the act of selecting the group of text sentences can involve selecting the group of text sentences based at least in part on the metadata.

In some embodiments, the method 400 can involve transmitting the podcast content and the audio summary to a client device.

As discussed above, implementations of the disclosed methods and systems provide technological improvements that are particular to computer networks and computing systems, for example, audio processing systems and systems that facilitate the production and/or distribution of podcasts, such as podcast summarization system 100.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    receiving podcast content;
    generating a transcript of at least a portion of the podcast content;
    parsing the podcast content to (i) identify audio segments within the podcast content, (ii) determine classifications for the audio segments, and (iii) detect pauses representative of transitions in audio of the podcast content;
    based on the audio segments, the classifications, and the pauses, dividing the transcript into text sentences;
    from among the text sentences of the transcript, selecting a group of text sentences for use in generating an audio summary of the podcast content; and
    combining portions of audio in the podcast content that correspond to the group of text sentences to generate an audio file representing the audio summary of the podcast content.

2. The method of claim 1, further comprising:
    parsing the podcast content to identify speakers of the audio segments; and
    labeling each text sentence of the transcript with a respective one of the speakers,
    wherein selecting the group of text sentences for use in generating the audio summary of the podcast content is based at least in part on the speakers with which at least a portion of the group of text sentences are labeled.

3. The method of claim 1, wherein the classifications distinguish speech audio segments from music audio segments.

4. The method of claim 1, wherein selecting the group of text sentences comprises selecting the group of text sentences based at least in part on the group of text sentences each being within a pre-determined time range within the podcast content.

5. The method of claim 1, further comprising:
    receiving a pre-determined text or audio provider-created summary associated with a content provider of the podcast content,
    wherein selecting the group of text sentences comprises selecting the group of text sentences based at least in part on the group of text sentences each having at least a threshold quantity of keywords from a stored list of keywords, the stored list of keywords including proper nouns and dates.

6. The method of claim 1, further comprising:
    receiving a pre-determined text or audio provider-created summary associated with a content provider of the podcast content,
    wherein selecting the group of text sentences comprises selecting the group of text sentences based at least in part on the group of text sentences each having at least a threshold degree of similarity with sentences from the pre-determined text or audio provider-created summary, and
    wherein the group of text sentences each having at least a threshold degree of similarity with sentences from the pre-determined text or audio provider-created summary is based at least in part on the group of text sentences each having at least a threshold quantity of keywords that are included as text or spoken in the pre-determined text or audio provider-created summary.

7. The method of claim 1, wherein the podcast content represents an episode of a podcast, the method further comprising:
receiving metadata associated with the podcast content, the metadata identifying a content provider associated with the podcast content, a title of the podcast, and a title of the episode,
wherein selecting the group of text sentences comprises selecting the group of text sentences based at least in part on the metadata.

8. The method of claim 1, wherein the method is performed by a server computing system of a content distribution system that maintains and provides access to the podcast content.

9. The method of claim 1, wherein the podcast content comprises a digital audio file.

10. A non-transitory computer-readable storage medium, having stored thereon program instructions that, upon execution by a processor, cause performance of a set of operations comprising:
receiving podcast content;
generating a transcript of at least a portion of the podcast content;
parsing the podcast content to (i) identify audio segments within the podcast content, (ii) determine classifications for the audio segments, and (iii) detect pauses representative of transitions in audio of the podcast content;
based on the audio segments, the classifications, the pauses, dividing the transcript into text sentences;
from among the text sentences of the transcript, selecting a group of text sentences for use in generating an audio summary of the podcast content; and
combining portions of audio in the podcast content that correspond to the group of text sentences to generate an audio file representing the audio summary of the podcast content.

11. The non-transitory computer-readable storage medium of claim 10, the set of operations further comprising:
parsing the podcast content to identify speakers of the audio segments; and
labeling each text sentence of the transcript with a respective one of the speakers,
wherein selecting the group of text sentences for use in generating the audio summary of the podcast content is based at least in part on the speakers with which at least a portion of the group of text sentences are labeled.

12. The non-transitory computer-readable storage medium of claim 10, wherein the classifications distinguish speech audio segments from music audio segments.

13. The non-transitory computer-readable storage medium of claim 10, wherein selecting the group of text sentences comprises selecting the group of text sentences based at least in part on the group of text sentences each being within a pre-determined time range within the podcast content.

14. The non-transitory computer-readable storage medium of claim 10, the set of operations further comprising:
receiving a pre-determined text or audio provider-created summary associated with a content provider of the podcast content,
wherein selecting the group of text sentences comprises selecting the group of text sentences based at least in part on the group of text sentences each having at least a threshold quantity of keywords from a stored list of keywords, the stored list of keywords including proper nouns and dates.

15. The non-transitory computer-readable storage medium of claim 10, the set of operations further comprising:
receiving a pre-determined text or audio provider-created summary associated with a content provider of the podcast content,
wherein selecting the group of text sentences comprises selecting the group of text sentences based at least in part on the group of text sentences each having at least a threshold degree of similarity with sentences from the pre-determined text or audio provider-created summary, and
wherein the group of text sentences each having at least a threshold degree of similarity with sentences from the pre-determined text or audio provider-created summary is based at least in part on the group of text sentences each having at least a threshold quantity of keywords that are included as text or spoken in the pre-determined text or audio provider-created summary.

16. The non-transitory computer-readable storage medium of claim 10, wherein the podcast content represents an episode of a podcast, the set of operations further comprising:
receiving metadata associated with the podcast content, the metadata identifying a content provider associated with the podcast content, a title of the podcast, and a title of the episode,
wherein selecting the group of text sentences comprises selecting the group of text sentences based at least in part on the metadata.

17. The non-transitory computer-readable storage medium of claim 10, wherein the podcast content comprises a digital audio file.

18. The non-transitory computer-readable storage medium of claim 10, wherein the processor is a processor of a server computing system of a content distribution system that maintains and provides access to the podcast content.

19. A computing system comprising:
a processor; and
a non-transitory computer-readable storage medium, having stored thereon program instructions that, upon execution by the processor, cause performance of a set of operations comprising:
receiving podcast content;
generating a transcript of at least a portion of the podcast content;
parsing the podcast content to (i) identify audio segments within the podcast content, (ii) determine classifications for the audio segments, and (iii) detect pauses representative of transitions in audio of the podcast content;
based on the audio segments, the classifications, the pauses, dividing the transcript into text sentences;
from among the text sentences of the transcript, selecting a group of text sentences for use in generating an audio summary of the podcast content; and
combining portions of audio in the podcast content that correspond to the group of text sentences to generate an audio file representing the audio summary of the podcast content.

20. The computing system of claim 19, wherein the podcast content comprises a digital audio file.

* * * * *